United States Patent
Westoby et al.

(10) Patent No.: US 9,719,158 B2
(45) Date of Patent: Aug. 1, 2017

(54) EXPLOSIVELY DEPTH HARDENED CRAWLER SHOES

(71) Applicant: Progress Rail Services Corporation, Albertville, AL (US)

(72) Inventors: Michael Charles Westoby, Linlithgow (GB); Gillon Ford, East Calder (GB)

(73) Assignee: Progress Rail Services Corporation, Albertville, AL (US)

( * ) Notice: Subject to any disclaimer, the term of this patent is extended or adjusted under 35 U.S.C. 154(b) by 129 days.

(21) Appl. No.: 14/585,059

(22) Filed: Dec. 29, 2014

(65) Prior Publication Data

US 2016/0185404 A1 Jun. 30, 2016

(51) Int. Cl.
| | |
|---|---|
| *B62D 55/20* | (2006.01) |
| *C22C 38/04* | (2006.01) |
| *C21D 1/06* | (2006.01) |
| *C21D 9/00* | (2006.01) |
| *B62D 55/14* | (2006.01) |
| *B62D 55/21* | (2006.01) |
| *B62D 55/26* | (2006.01) |

(52) U.S. Cl.
CPC .............. *C22C 38/04* (2013.01); *B62D 55/14* (2013.01); *B62D 55/202* (2013.01); *C21D 1/06* (2013.01); *C21D 9/0068* (2013.01); *B62D 55/21* (2013.01); *B62D 55/26* (2013.01)

(58) Field of Classification Search
CPC ......... B62D 55/14; B62D 55/21; B62D 55/26
USPC ........ 305/201, 111, 113, 185, 186, 196, 198, 305/200, 187
See application file for complete search history.

(56) References Cited

U.S. PATENT DOCUMENTS

| | | | |
|---|---|---|---|
| 2,703,297 A | 3/1955 | MacLeod | |
| 3,172,199 A | 3/1965 | Schmidt | |
| 3,218,199 A | 11/1965 | Cowan et al. | |
| 7,040,080 B2 | 5/2006 | Okawa et al. | |
| 7,530,650 B2 * | 5/2009 | Hannan | B62D 55/202 305/196 |
| 8,011,739 B2 * | 9/2011 | Busley | B62D 55/275 305/189 |
| 9,434,428 B2 * | 9/2016 | Hakes | B62D 55/20 |
| 2013/0313891 A1 * | 11/2013 | O'Neill | B62D 55/202 305/198 |
| 2014/0152086 A1 | 6/2014 | Meyer et al. | |

FOREIGN PATENT DOCUMENTS

| | | |
|---|---|---|
| CN | 100999781 A | 7/2007 |
| GB | 2172234 A | 9/1986 |
| WO | WO-2010023675 A1 | 3/2010 |
| WO | WO-2011022463 A2 | 6/2011 |

* cited by examiner

*Primary Examiner* — S. Joseph Morano
*Assistant Examiner* — Jean Charleston
(74) *Attorney, Agent, or Firm* — Finnegan, Henderson, Farabow, Garrett & Dunner, LLP

(57) ABSTRACT

A method of making a crawler shoe for a mobile machine having a track assembly is disclosed. The method may include casting a crawler shoe from manganese steel, the crawler shoe having at least one wear surface that engages the track assembly. The method may further include solution treating the crawler shoe to form fully austenitic manganese steel, applying an explosive material to the at least one wear surface, and detonating the explosive material.

10 Claims, 5 Drawing Sheets

EXPLOSIVELY DEPTH HARDENED CRAWLER SHOES

TECHNICAL FIELD

The present disclosure relates generally to crawler shoes and, more particularly, to crawler shoes that have been depth hardened with explosives.

BACKGROUND

A track-type mobile machine utilizes tracks located at either side of the machine to propel the machine. The tracks each include a chain having links pinned end-to-end to form a loop that extends around a drive sprocket and one or more idler wheels, and ground-engaging pads connected to each pair of links in the chain. A ground-engaging pad, together with a pair of links, is commonly referred to as a crawler shoe. In some embodiments, the crawler shoe is a single cast and/or forged component made of steel. During operation, each crawler shoe encounters forces cause by the weight of the machine and torque from the engine for driving the machine. The forces are transmitted through the crawler shoes and into the ground surface, thereby creating traction to propel the machine.

Over time, the forces acting on the crawler shoes can cause localized wear and plastic deformation, leading to a shortened life span of the crawler shoes. Steel crawler shoes are sometimes hardened using heat treating processes such as quench and tempering to resist wear and prolong the life of the crawler shoes. Multiple heat treatment steps are typically used to achieve a minimum hardness at particular depths below the surface of crawler shoes. An example of this type of hardening process is disclosed in U.S. Pat. No. 7,040,080 of Okawa et al. that issued on May 9, 2006. However, hardening processes that involve multiple tempering and/or other heat treating steps require high energy inputs and are expensive, which increases the price of crawler shoes to the end user.

The disclosed crawler shoes are directed to overcoming one or more of the problems set forth above.

SUMMARY

In one aspect, the present disclosure is directed to a method of making a crawler shoe. The method may include casting a crawler shoe from manganese steel, the crawler shoe having at least one wear surface. The method may further include solution treating the crawler shoe to form fully austenitic manganese steel, applying an explosive material to the at least one wear surface, and detonating the explosive material.

In another aspect, the present disclosure is directed to a crawler shoe having a ground-engaging pad formed of fully austenitic manganese steel, a ground-engaging surface disposed on a bottom side of the ground-engaging pad, a top side opposite the bottom side, and at least one wear surface disposed on the top side. The at least one wear surface may have a hardness of at least about 280 HBW at a depth of about 5 mm.

In yet another aspect, the present disclosure is directed to a crawler shoe having a ground-engaging pad formed of fully austenitic manganese steel, a ground-engaging surface disposed on a bottom side of the ground-engaging pad, a top side opposite the bottom side, and at least one hardened wear surface disposed on the top side. The at least one wear surface may be hardened by explosive depth hardening.

DETAILED DESCRIPTION

Figure 1:
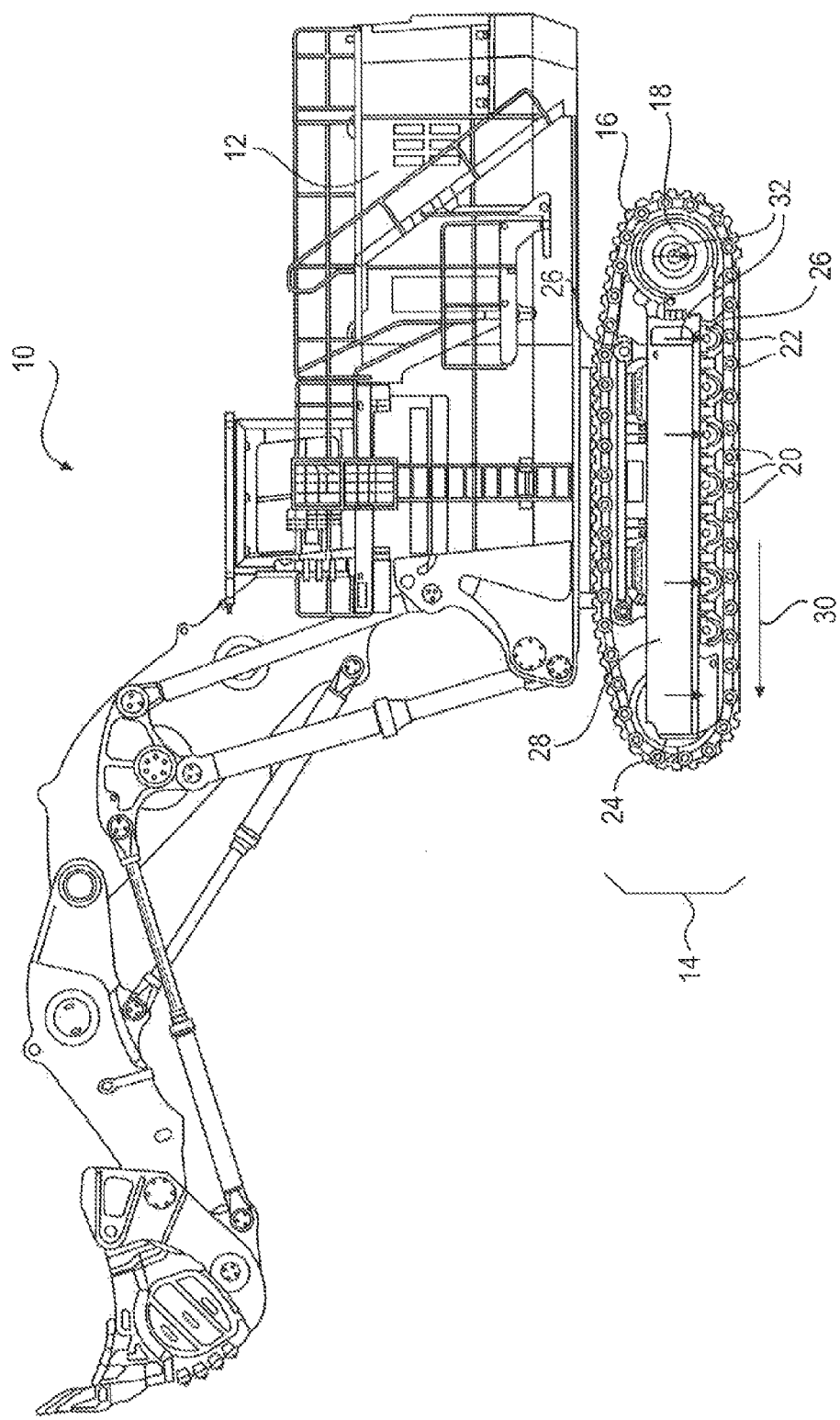
FIG. 1 is a side-view illustration of an exemplary disclosed mobile machine.

FIG. 1 illustrates a track type mobile machine 10 having an engine 12 supported by a frame and configured to drive a tracked undercarriage 14. Mobile machine 10 may be any machine that performs an operation associated with an industry such as mining, construction, farming, or another industry known in the art. For example, machine 10 may be a material moving machine such as a front shovel, a rope shovel, a hydraulic excavator, a dozer, a loader, or another material moving machine.

Undercarriage 14 may include parallel track assemblies 16 that are located at opposing sides of machine 10 and driven by engine 12 via corresponding drive wheels 18 (only one track assembly 16 and one drive wheel 18 are shown in FIG. 1). Each track assembly 16 may include a plurality of crawler shoes 20 connected end-to-end via pins 22 to form an endless loop. The endless loop of crawler shoes 20 may be wrapped around corresponding drive wheels 18, one or more idler wheels 24, and at least one roller 26. Drive wheels 18 may engage pins 22 (or engage bushings that encase pins 22), drive lugs, or other features of crawler shoes 20 and thereby transmit torque from engine 12 to track assemblies 16. Idler wheels 24 and rollers 26 may guide track assemblies 16 in a general elliptical trajectory around drive wheels 18. A tensioner 28 may be located between idler wheel 24 and drive wheel 18 to push these components apart and thereby maintain a desired tension of track assembly 16. Crawler shoes 20 may function to transmit the torque from drive wheels 18 as a driving linear (tractive) force 30 into a ground surface. The weight of machine 10 may be transmitted from drive wheel 18, idler wheel 24, and rollers 26 through crawler shoes 20 as a bearing force 32 into the ground surface.

Figure 2:
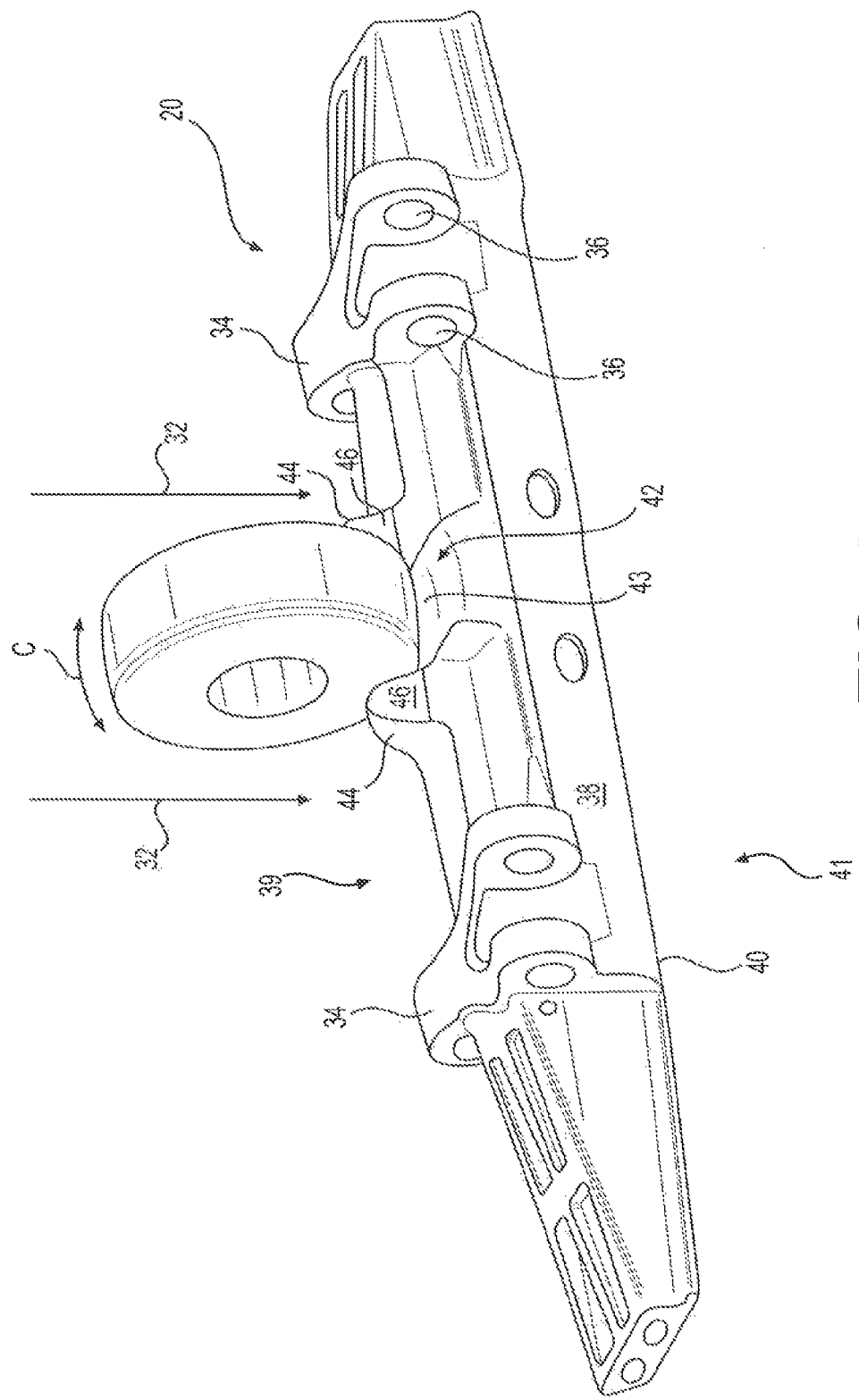
FIG. 2 is an isometric illustration of an exemplary disclosed crawler shoe that may be used in conjunction with the mobile machine of FIG. 1.

FIG. 2 shows an exemplary crawler shoe 20 engaging roller 26. Crawler shoe 20 may include one or more pairs of spaced-apart links 34 that are generally parallel with each other. Each link 34 may include at least one pin bore 36 formed at an end thereof for connecting to links of other crawler shoes, thereby forming a chain. Crawler shoe 20 may include a ground-engaging pad 38, and links 34 may be disposed on a top side 39 of ground-engaging pad 38, thereby rigidly connecting links 34 to each other. A ground-engaging surface 40 may be disposed at a bottom side 41 of ground-engaging pad 38 opposite links 34. In this example, ground-engaging pad 38 and links 34 are integrally formed as a single cast and/or forged component. In other embodiments, links 34 and ground-engaging pad 38 may be formed separately and joined by any suitable process known in the art, such as by welding and/or using threaded fasteners, if desired. Ground-engaging pad 38 may have any external geometry known in the art. For example, ground-engaging pad 38 may be generally plate-like, include transverse ridges or grousers, have openings, and/or include any other features common in the art.

Ground-engaging pad 38 may include a roller path 42 disposed on top side 39. Roller path 42 may be disposed between links 34 and extend across crawler shoe 20. Roller path 42 may define a surface for guiding roller 26 across crawler shoe 20. A wear surface 43 may be disposed on roller path 42 that engages roller 26. Roller paths 42 and wear surfaces 43 of all crawler shoes 20 within a particular track assembly 16 may form a substantially continuous smooth surface upon which rollers 26 may ride. The weight of machine 10 may be transmitted from roller 26 through wear surface 43, which applies a bearing force 32 on wear surface 43. Over time, bearing force 32 may cause plastic deformation of crawler shoe 20 at wear surface 43. Wear surface 43 may be planar, arcuate, or have any suitable shape for engaging roller 26. For example, roller 26 may have a curvature C (see FIG. 2), and wear surface 43 may be shaped with a similar curvature. When machine 10 is in motion, additional rolling and sliding forces between wear surface 43 and roller 26 create friction wearing of wear surface 43. Abrasive debris such as gravel, dirt, sand, or other ground material may lodge between roller 26 and wear surface 43 and cause additional wearing and/or grinding of wear surface 43.

In the example of FIG. 2, crawler shoe 20 includes a pair of drive lugs 44 disposed on the top side 39 of ground-engaging pad 38 that engage drive wheels 18 in track assembly 16. Drive lugs 44 may be disposed between links 34 on either side of wear surface 43. In other embodiments, drive lugs 44 may be positioned at other locations on crawler shoe 20, and fewer or more drive lugs 44 may be included. Drive lugs 44 may contact openings, pockets, or teeth of drive wheels 18 in track assembly 16 to receive torque from engine 12 and provide tractive force 30 to crawler shoe 20 for moving machine 10. Drive lugs 44 may have one or more wear surfaces 46 that contact drive wheels 18. When machine 10 is in motion, wear surfaces 46 experience grinding and wearing from the forces transmitted by drive wheels 18, which can be magnified when abrasive debris become lodged between drive lugs 44 and drive wheels 18.

Figure 3:
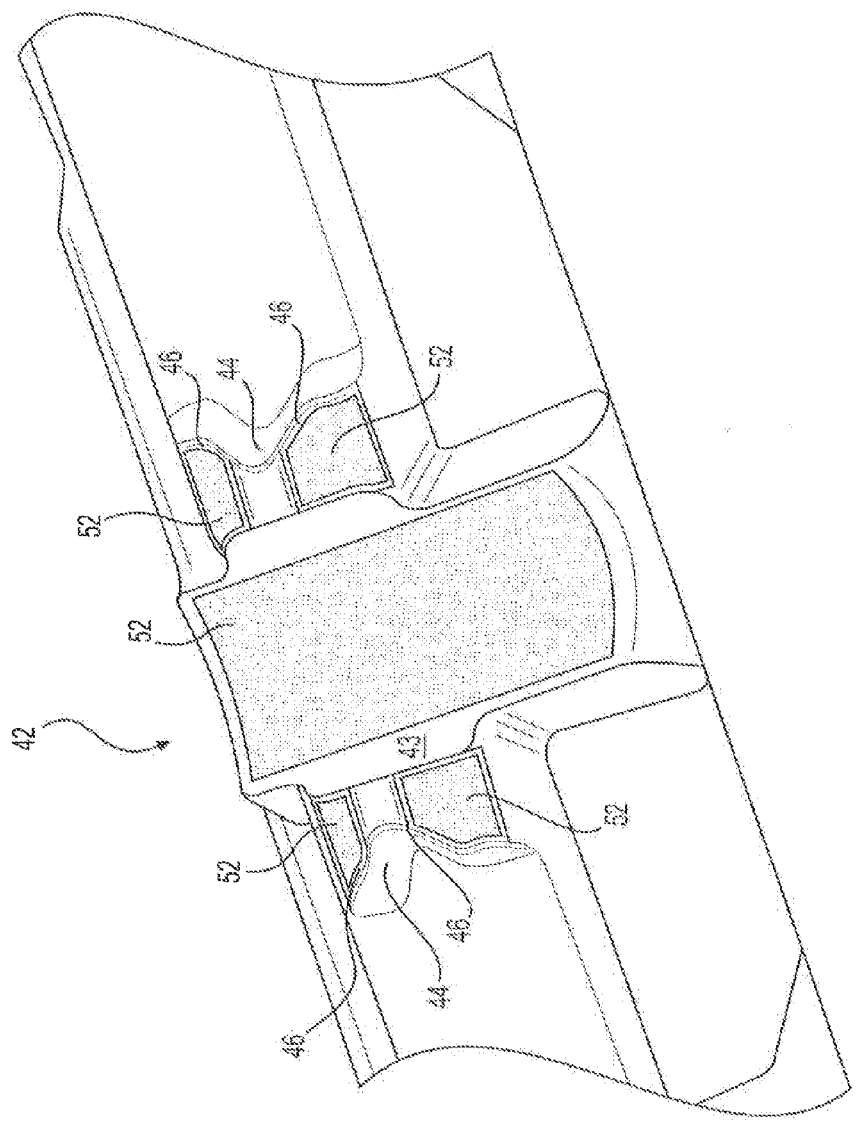
FIG. 3 is a top view of the crawler shoe of FIG. 2.

FIG. 3 shows a top view of crawler shoe 20. Wear surfaces 46 may be disposed on front and back sides of drive lugs 44 so machine 10 can be driven in forward and reverse directions. In this example, drive lugs 44 are adjacent to wear surface 43, but may be located elsewhere in other embodiments. Rollers 26 may also be configured to engage and/or slide against the inboard sides of drive lugs 44 as they pass along wear surface 43, thereby helping to guide track assembly 16 in a desired trajectory around idler wheel 24 and drive wheel 18.

Figure 4:
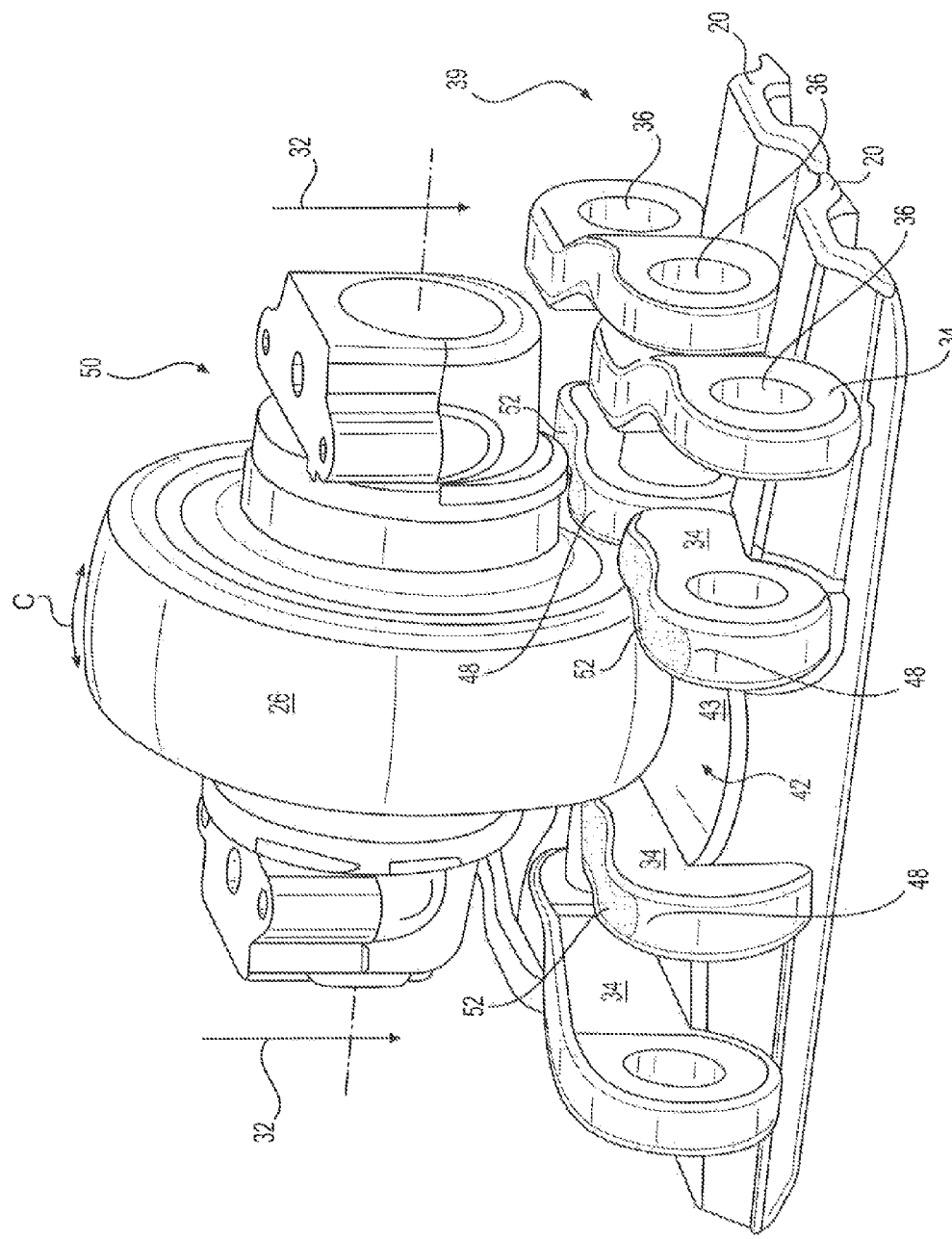
FIG. 4 is an isometric illustration of a second exemplary disclosed crawler shoe that may be used in conjunction with the mobile machine of FIG. 1.

In other embodiments, drive wheels 18 may alternatively engage pins 22 to provide tractive force 30 to crawler shoes 20. For example, FIG. 4 shows a second exemplary crawler shoe 20 that includes pairs of spaced-apart links 34 that are generally parallel with each other. Each link 34 may include at least one pin bore 36 formed at an end thereof. Links 34 may be configured join links 34 of adjacent crawler shoes by aligning pin bores 36 of adjacent links and passing pins 22 through pin bores 36, thereby forming a chain. It is contemplated that other configurations may also be possible.

Crawler shoes 20 may include a wear surface 48 disposed on at least one of links 34. Wear surface 48 may be configured to engage parts associated with drive wheel 18, idler wheel 24, and/or roller 26 of track assembly 16. Wear surface 48 may be located on top side 39 of ground-engaging pad 38 of crawler shoe 20. In this example, in addition to passing through rollers 26, bearing forces 32 may also pass to crawler shoe 20 through a hub 50 of roller 26 that rides over wear surface 48 of each link 34. Wear surface 48 may be planer or shaped to match the shape of hub 50, idler wheel 24, and/or drive wheel 18. Over time, bearing threes 32 may cause wearing and/or plastic deformation of wear surfaces 48. Wearing may be magnified when abrasive debris become lodged between wear surfaces 48 and hub 50, idler wheel 24, and/or drive wheel 18.

Figure 5:
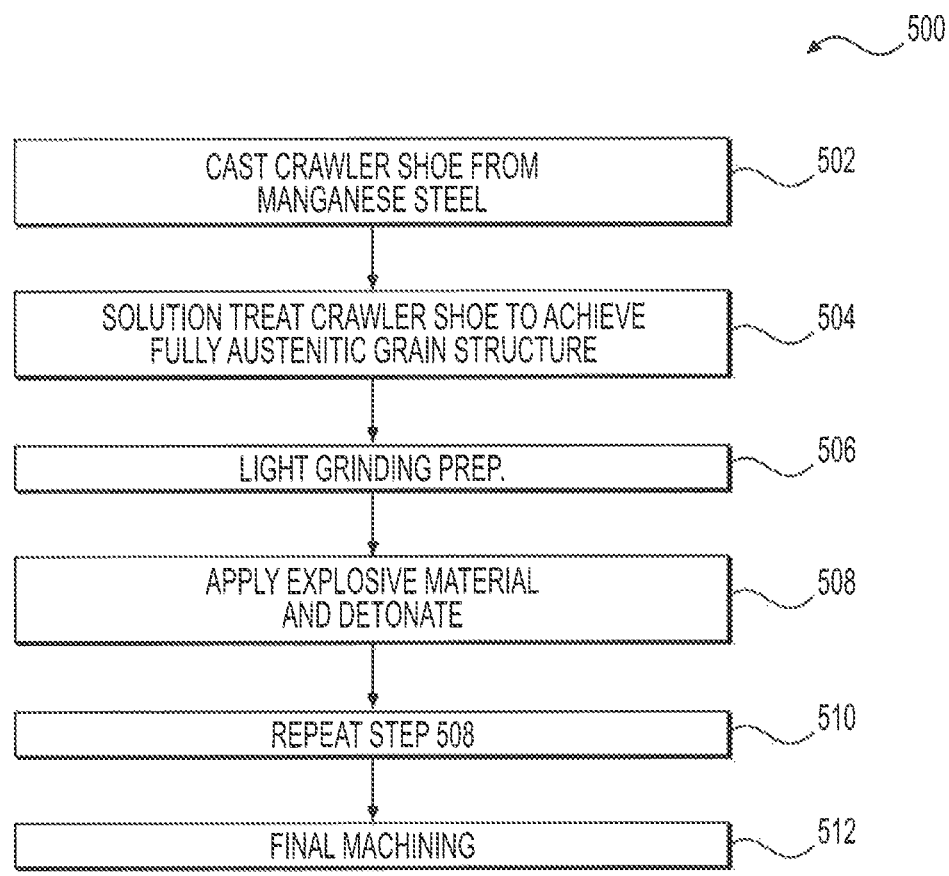
FIG. 5 is a flow chart showing an exemplary disclosed process of forming crawler shoes that may be used to form the crawler shoes of FIGS. 2-4.

To withstand bearing forces 32 without cracking or breaking, crawler shoes 20 may be formed of a metal having high strength, such as manganese steel. Manganese steel may be cast to produce crawler shoes 20 of any suitable shape and dimensions, but may be brittle after casting. Thus, crawler shoes cast from manganese steel may be solution treated to achieve austenitic grain structure in the metal, which improves overall toughness. Before casting, chromium may be added to the manganese steel to promote faster work hardening of the austenitic manganese steel. Because austenitic manganese steel is also soft, crawler shoes 20 may experience plastic deformation near wear surfaces 43, 46, and 48 during use. Instead of performing expensive and time consuming heat treatment processes to harden crawler shoes 20, explosive depth hardening may be used to harden particular portions of crawler shoes 20, such as wear surfaces 43, 46, and 48. Explosive depth hardening may locally harden austenitic manganese steel to resist wearing and pre-harden the steel, which decreases plastic deformation during use. Reducing wear plastic deformation may increase the service life of crawler shoes 20 and reduce the overall cost to the end user. Processes for forming and hardening crawler shoes formed of manganese steel will be described in the following section with reference to FIG. 5.

INDUSTRIAL APPLICABILITY

The crawler shoes of the present disclosure may be applicable to any track-type mobile machine. However, the disclosed crawler shoes may be particularly applicable to larger machines, in which the forces passing through the track assembly are significant and can affect longevity of the crawler shoes. This may be particularly important for expensive machines that operate around the clock, where downtime and the price of replacement crawler shoes are costly to the owner. Processes of forming and hardening crawler shoes made of manganese steel will now be discussed with reference to FIG. 5.

In a process 500, crawler shoes 20 may be cast from manganese steel (Step 502) according any suitable casting process known in the art. As used herein, manganese steel may refer to any suitable type of manganese steel or manganese steel alloy for high-strength applications. In some embodiments, chromium may be added to manganese steel before casting in order to increase the rate of work hardening of finished crawler shoes 20. For example, crawler shoes 20 may be cast from manganese steel containing between about 1.0-3.5% chromium. Because the work hardening rate increases as more chromium is added, crawler shoes 20 may be cast from manganese steel containing at least 1.0% chromium in order to reduce in-service plastic deformation of crawler shoes 20. However, the addition of chromium may be limited to avoid causing carbide embrittlement of the manganese steel. For example, manganese steel containing 14% manganese may include about 1.5% chromium. It is contemplated that manganese steel containing other amounts of chromium may also be used depending on the content of manganese in the steel and the extent to which it is desired to affect the work hardening rate. It is further contemplated that other manganese steel alloys may be used.

Crawler shoes 20 cast from manganese steel may be brittle after casting. Thus, crawler shoes 20 may then be solution treated (Step 504) to increase the strength of the metal and reduce brittleness. Solution treating may include raising the temperature of the manganese steel to a high temperature (e.g. about 1000° C.) for about 1-6 hours (depending on the size and thickness of crawler shoe 20) to achieve a fully austenitic grain structure within the manganese steel alloy. Manganese steel having a fully austenitic grain structure is tough, but is considered "soft" and may be further hardened to reduce plastic deformation in the field and resist surface wear during work hardening. However, further heat treatment processes, such as those traditionally used to increase metal hardness, are not desirable for hardening fully austenitic manganese steel because re-heating fully austenitic manganese steel can lead to embrittlement, which can lead to failure of crawler shoes 20 under bearing forces 32.

Crawler shoes 20 may then receive light grinding preparations (Step 506), if desired, before explosive material is applied to one or more wear surfaces (e.g. wear surfaces 43, 46, and 48 of crawler shoe 20 and detonated (Step 508). Any suitable plastic sheet explosive or other type of explosive material may be used. For example, suitable explosive materials may include, among other ingredients, PETN, RDX, HMX, TNT, or combinations thereof. Energy waves generated by the detonation of explosive material may increase localized hardening of the manganese steel at and/or near the wear surfaces to which the explosive material was applied. Referring to FIG. 3, for example, explosive material 52 may be applied to wear surface 43 that contacts roller 26 and/or to surfaces 46 of drive lugs 44 that contact drive wheel 18 of track assembly 16. Explosive material 52 may also be applied to crawler shoes 20 having wear surfaces on links 34, such as wear surfaces 48 that contact hubs 50 of rollers 26 (referring to FIG. 4). It is contemplated that explosive material may be applied to any type of wear surface or other surface of crawler shoe 20 that experiences plastic deformation or surface wearing.

After detonation, wear surfaces 43 and 46 may be pre-hardened and therefore may be more resistant to plastic deformation and surface wear during use. That is, the energy of detonation may cause localized plastic deformation of the manganese steel at or near wear surfaces 43 and 46, which renders them harder than before. The result is that crawler shoes 20 may be plastically deformed (and therefore hardened) at and/or near wear surfaces 43 and 46 before they are used in track assembly 16, which may reduce the amount of deformation that occurs during use. Reducing plastic deformation during work hardening may reduce the loosening of track assembly 16 within undercarriage 14, thereby reducing impact forces, vibrations, and deformations that can reduce the service life of crawler shoes 20 and other components of undercarriage 14.

Multiple repetitions of step 508 may be performed in order to sufficiently harden the manganese steel to a certain depth below the surface of crawler shoe 20 (Step 510). Each time step 508 is repeated, the manganese steel may become hardened at successively lower depths below the surface of crawler shoe 20. Multiple repetitions of step 508 may be used instead of performing a single iteration of step 508 with more explosive material in order to avoid damaging crawler shoe 20. Any number of iterations of step 508 may be used depending on the desired depth of hardness, desired surface hardness, and the amount of explosive material used during each iteration. For example, a minimum of two, three, or more detonations may be required to achieve sufficient hardening. It is contemplated that a single detonation may be sufficient in some applications.

Desired depth hardness and surface hardness may depend upon the size of machine 10 and the abrasiveness of the environment in which crawler shoe 20 may be used. For example, crawler shoe 20 may be explosively depth hardened until it has a hardness of at least about 280 HBW (Brinell hardness tested with a tungsten carbide ball) at a depth of about 5 mm below the one or more wear surfaces (e.g. 43, 46, and/or 48). This depth hardening may pre-harden crawler shoe 20 and reduce plastic deformation during use. Explosive hardening may also be continued until crawler shoe 20 has a hardness of at least about 350 HBW on the one or more wear surface (e.g. 43, 46, and/or 48). This surface hardening may improve the resistance of crawler shoes 20 to wearing caused by, for example, the grinding of abrasive materials between roller 26 and wear surface 43. Once the one or more wear surfaces (e.g. 43, 46, and 48) of crawler shoe 20 have been sufficiently hardened, crawler shoe 20 may receive final machining (Step 512) in preparation for use with machine 10.

Process 500 may be used to form or to harden crawler shoes 20 made of manganese steel at a lower cost than traditional hardening processes. By solution treating the manganese steel only once to achieve austenitic grain structure, process 500 may be used to harden crawler shoes made of manganese steel with less input energy. The time taken to harden crawler shoes may also be reduced by obviating the need to repeat lengthy heat treatment processes. Hardened crawler shoes 20 may also require less frequent maintenance grinding and track adjustments, thereby decreasing maintenance costs. Accordingly, process 500 may reduce the energy input and time taken to harden crawler shoes made of manganese steel, thereby improving the useful life of crawler shoes and reducing cost to the end consumer.

It will be apparent to those skilled in the art that various modifications and variations can be made to the disclosed crawler shoes. Other embodiments will be apparent to those skilled in the art from consideration of the specification and practice of the disclosed crawler shoes. It is intended that the specification and examples be considered as exemplary only, with a true scope being indicated by the following claims and their equivalents.

What is claimed is:

1. A crawler shoe, comprising:
   a ground-engaging pad formed of fully austenitic manganese steel;
   a ground-engaging surface disposed on a bottom side of the ground-engaging pad;
   a top side opposite the bottom side;
   at least one wear surface disposed on the top side, and having a hardness of at least about 280 HBW at a depth of about 5 mm; and
   at least one drive lug disposed on the top side, the at least one wear surface disposed on the at least one drive lug.

2. The crawler shoe of claim 1, wherein the ground-engaging pad is formed of fully austenitic manganese steel containing chromium.

3. The crawler shoe of claim 1, wherein:
the crawler shoe further includes a roller path disposed on the top side; and
the at least one wear surface is disposed on the roller path.

4. The crawler shoe of claim 1, wherein:
the crawler shoe further includes laterally spaced-apart links disposed on the top side; and
the at least one wear surface is disposed on the laterally spaced-apart links.

5. The crawler shoe of claim 1, wherein the at least one wear surface has a hardness of at least about 350 HBW.

6. A crawler shoe, comprising:
a ground-engaging pad formed of fully austenitic manganese steel;
a ground-engaging surface disposed on a bottom side of the ground-engaging pad;
a top side opposite the bottom side;
at least one wear surface disposed on the top side, wherein the at least one wear surface is hardened by explosive depth hardening; and
at least one drive lug disposed on the top side, the at least one wear surface disposed on the at least one drive lug.

7. The crawler shoe of claim 6, wherein the ground-engaging pad is formed of fully austenitic manganese steel containing chromium.

8. The crawler shoe of claim 6, wherein:
the crawler shoe further includes a roller path disposed on the top side; and
the at least one wear surface is disposed on the roller path.

9. The crawler shoe of claim 6, wherein:
the crawler shoe further includes laterally spaced-apart links disposed on the top side; and
the at least one wear surface is disposed on the laterally spaced-apart links.

10. The crawler shoe of claim 6, wherein the at least one wear surface has a hardness of at least about 350 HBW.

* * * * *